July 31, 1945.　　O. N. GOVE ET AL　　2,380,750
ROUTING APPARATUS
Filed Sept. 4, 1942　　2 Sheets-Sheet 1
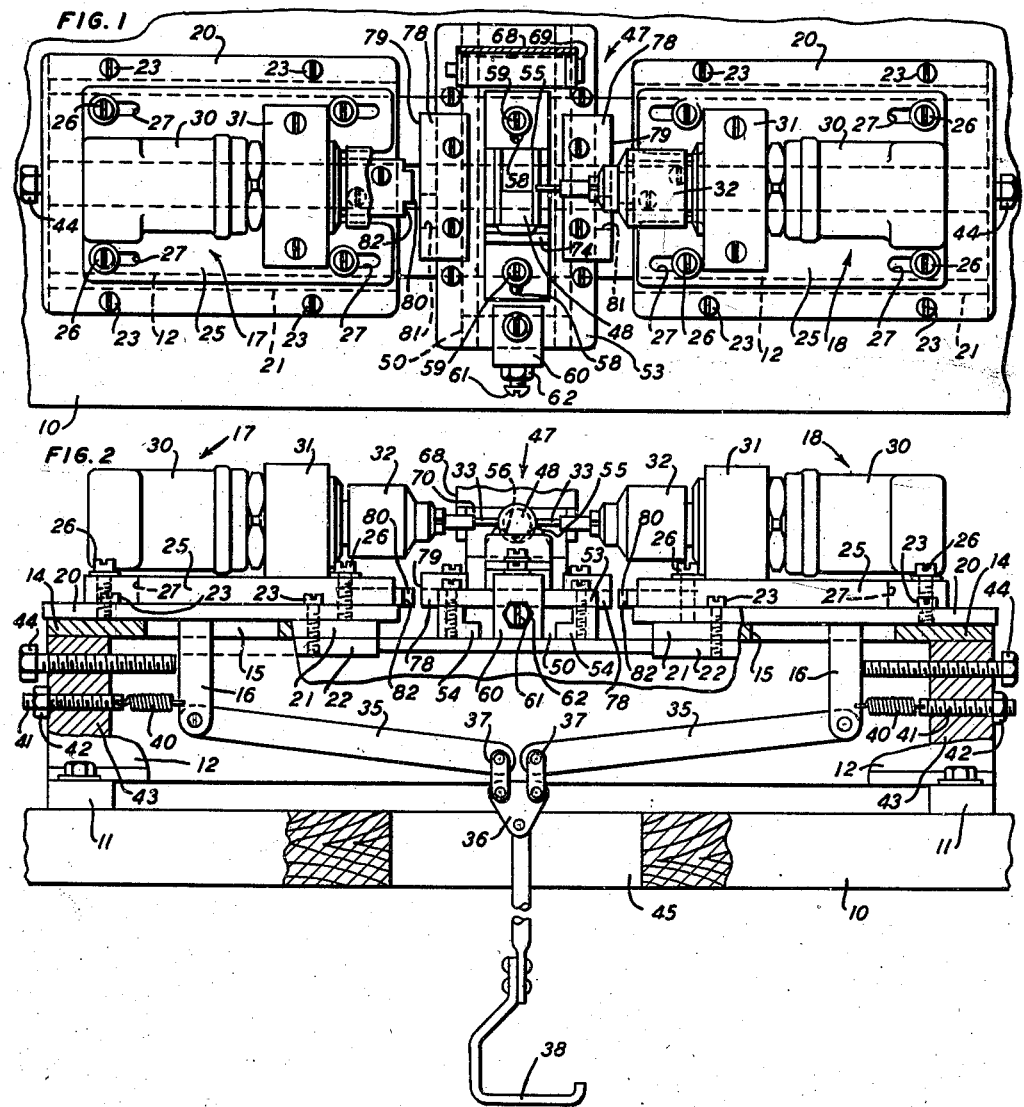
INVENTORS
O. N. GOVE
L. L. MILLER
BY
E. R. Nowlan
ATTORNEY July 31, 1945.  O. N. GOVE ET AL  2,380,750
ROUTING APPARATUS
Filed Sept. 4, 1942   2 Sheets-Sheet 2
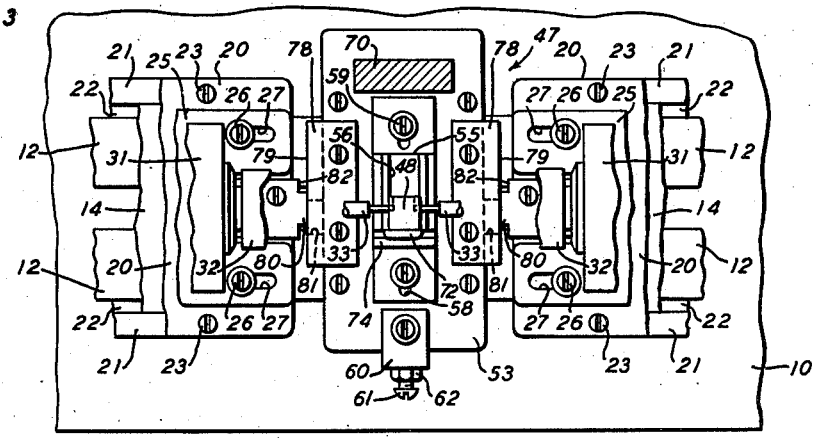
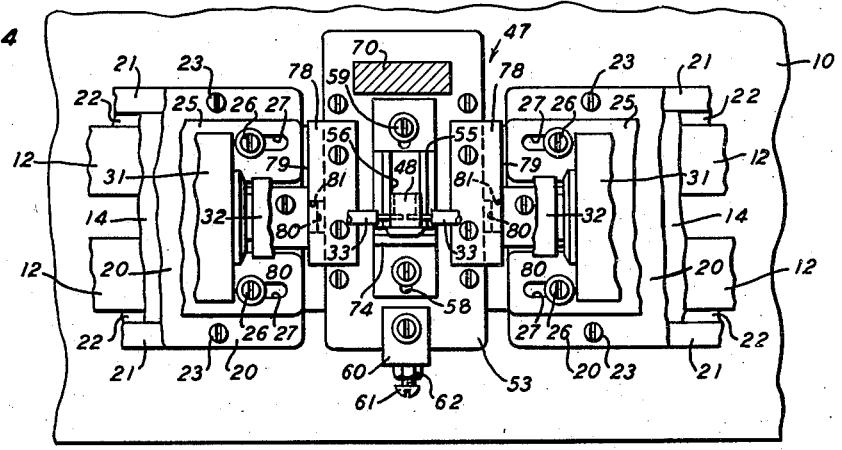
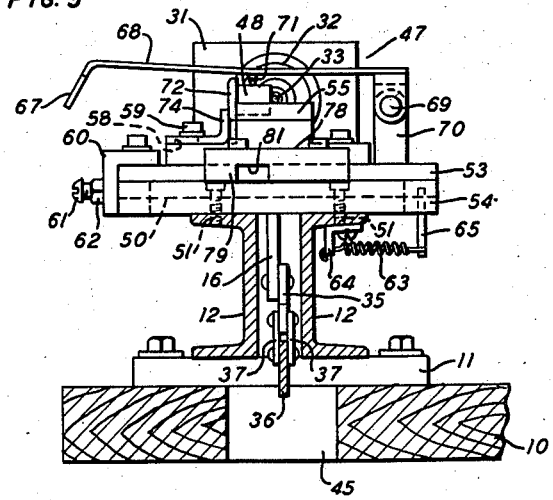
INVENTORS
O. N. GOVE
L. L. MILLER
BY
E. R. Nowlan
ATTORNEY Patented July 31, 1945

2,380,750

UNITED STATES PATENT OFFICE 2,380,750

ROUTING APPARATUS

Otis N. Gove and Lloyd L. Miller, Cranford, N. J., assignors to Western Electric Company, Incorporated, New York, N. Y., a corporation of New York Application September 4, 1942, Serial No. 457,366

5 Claims. (Cl. 144—136)

This invention relates to routing apparatus, and more particularly to apparatus for forming grooves and apertures in articles.

An object of the invention is to provide an apparatus which is simple in structure and highly efficient in performing a plurality of routing operations simultaneously.

With this and other objects in view, the invention comprises spaced routing units, an article support interposed therebetween and movable relative thereto to control the action of the units in performing routing operations at opposed positions upon the article.

Other objects and advantages will be apparent from the following detailed description when considered in conjunction with the accompanying drawings, wherein Fig. 1 is a top plan view of the apparatus;

Fig. 2 is a front elevational view of the apparatus, portions thereof being broken away;

Figs. 3 and 4 are fragmentary top plan views of the apparatus illustrating positions of the parts during different portions of the operating cycle;

Fig. 5 is a vertical sectional view of the apparatus;

Fig. 6 is a side elevational view of the article prior to the routing operation;

Fig. 7 is a sectional view of the article after the routing operation, and

Fig. 8 is a sectional view of the article taken on the line 8—8 of Fig. 7.

Referring now to the drawings, attention is first directed to Figs. 1, 2 and 5, where a table 10 has a supporting plate 11 mounted thereon, the latter supporting channel members 12. Supporting plates 14 are mounted at spaced positions upon the upper surfaces of the channels 12, these plates having elongate apertures 15 therein for the projection and movement of arms 16. The arms 16 are parts of routing units 17 and 18 which are identical in structure and the parts thereof will be identified with like reference numerals. The arms 16 are rigidly mounted upon the under surfaces of slides 20 which rest upon the supporting plates 14 and are of greater width than their plates, as illustrated in Figs. 2 and 3. Additional strips 21 and 22 are secured to the edges of the slides 20 through the aid of screws 23, to extend around the edges of the support 14 and cooperate therewith in forming tongue and groove connections between the support and the slide. Base members 25 rest upon their respective slides and are adjustably secured thereto through the aid of screws 26 extending through elongate apertures 27 in the bases and into threaded apertures (not shown) in their slides.

Power means, such as air operated or electrically operated motors 30, are mounted by means of upright members 31 upon the base members 25, these motors having tool receiving chucks 32 to removably receive routing tools 33.

Attention is again directed to the arms 16 which are connected pivotally to the outer ends of links 35, the inner ends thereof being connected to a common member 36 through separate links 37. A treadle or foot support 38 is connected to the member 36 and, through this mechanism, the routing units 17 and 18 may be simultaneously moved toward each other by the application of downward pressure on the treadle 38. Means, such as springs 40, function to normally urge the units 17 and 18 into their inoperative positions shown in Figs. 1 and 2. The force of the springs 40 may be varied by adjustment of screws 41 relative to nuts 42, which bear against the outer walls of uprights 43 in which the screws are disposed. Limit or stop screws 44 are threadedly disposed in apertures in uprights 43 in general alignment with their respective arms 16 for the abutment of the arms thereagainst to limit the outward movement of the units 17 and 18. This mechanism including the operating means connecting the treadle 38 with the arms, is disposed between the channel members 12, an aperture 45 being disposed in the table 10 to allow movement of the associated mechanism.

A work supporting unit, indicated generally at 47, is interposed between the units 17 and 18 to support work or articles 48 upon which the routing operations are to be performed. The unit 47 includes a T-shaped member 50 disposed upon the upper surfaces of the channel members 12 and secured thereto by means of screws 51 (Fig. 5). A slide 53 rests upon the member 50 and has angle members 54 mounted upon the under surface thereof at the side edges, to provide interfitting connections with the T-shaped member 50 for sliding engagement of the slide 53 in a fixed line on the member. An article support 55, having a central portion with a V-groove 56 therein, receives and accurately locates the articles 48 at a given position between the routing units 17 and 18. The ends of the tool support 55 have elongate apertures 58 therein to receive screws 59, the latter being threadedly disposed in the slide 53 and adapted for longitudinal adjustment of the work support relative to the routing units by loosening the screws. An angle member 60, mounted at the forward end of the slides (Figs. 1, 2 and 5) serves as a stop to limit the rearward movement of the slide. An adjusting stop screw 61, through the aid of a lock nut 62 carried by the member 60, serves as a variable stop means to vary the position of the slide in its rearward movement. A spring 63 (Fig. 5) having one end secured to a bracket 64, which is mounted upon the adjacent channel member 12, and the other end connected to a pin 65 carried by the slide 53, normally urges the slide to its forward or loading position, which position is shown in Fig. 1.

Movement is imparted to the slide 53 and its associated elements through the aid of a handle 67, which is a part of a lever 68 pivotally supported at 69 upon a bracket 70, the latter being rigidly mounted upon the slide 53. A holding pin 71 integral with the lever 68, is pointed to partially project into the article 48 and hold it firmly in the groove 56 of the support 55 and particularly against rotation. It will be observed that the article 48 is circular in cross-section and is provided with a head portion 72 which rests against the forward end of the support 55 through the aid of a locating member 74. The locating member 74 is angular in general contour and is provided with an elongate aperture similar to the aperture 58 and is held in any desired adjusted position through the aid of an adjusting screw 59.

Upon considering the operation of the apparatus, let it be assumed that the apparatus is in its normal position, the routing units 17 and 18 in the position shown in Figs. 1 and 2 and the work supporting unit 47 in the forward position shown in Fig. 1. When in this position the lever 68 may be moved upwardly a sufficient distance to allow insertion of an article 48 on the support 55, the head 72 of the article between the end of the support and the member 74 as shown in Fig. 5. This having been accomplished and assuming that the motors 30 are in operation, the lever 68 may be lowered to position the pin 71 in gripping engagement with the article, after which pressure upon the handle 67 sufficient to move the slide 53 with its associated parts rearwardly, will move the slide relative to the routing units. Prior to the rearward movement of the slide, the treadle 38 is moved downwardly to bring the routing units toward each other limited distances. These distances are determined by control elements 78 which are mounted upon the slide 53 and extend downwardly over the side edges thereof, to provide engaging surfaces 79 for abutting portions 80 of the units 17 and 18, the latter being mounted upon their respective slides 20. The control elements 78 have recesses 81 therein to receive the portions 80, limiting shoulders 82 of the portions 80 limiting the distance in which the portions may project into the recesses.

Returning now to the operating sequence, after the article is located in the work support and held in place by the pin 71 of the lever 68, the treadle 38 may receive a sufficient pressure downwardly to move the units 17 and 18 toward each other against the force of the springs 40 and until the abutting portions 80 engage the surfaces 79 of the control member 78. At this time the unit 47 may be actuated by applying force to the handle 67, moving the slide 53 with the work support and article rearwardly, causing the routing tools 33 to cut grooves 85 at diametrically opposed positions in the wall of the article. This operation continues until the recesses 81 are brought into alignment with the portions 80, at which time the latter, through the applied force on the treadle 38, may move inwardly to cause the routing tools to cut apertures 86 into the article. The shoulders 82 of the portions 80 limit the depth of the apertures 86 by limiting the distance in which the units 17 and 18 may be moved toward each other.

This completes one half of the operating cycle. After this has been completed, the force may be removed from the treadle 38, allowing the springs 40 to return the units 17 and 18 to their normal positions against the stop screws 44. At this position it will be noted that the routing tools 33 have been moved free of the article, leaving the article free for its return movement. Then, by releasing the force on the handle 67, the unit 47 may be returned by the force of the spring 63 to its normal or forward position. During the latter movement, the lever 68 may be swung upwardly to free the article which has received its routing operation, so that the operator may remove this article and insert another. In other words, the operator is free to remove the article just after the completion of the half cycle, so that there may be an overlapping of cycles by the removal of one article for the insertion of another article before the completion of the cycle.

Upon reviewing the operation, attention is directed to Fig. 3, which shows the relationship of the routing units with article at about the center of the rearward movement of the unit 47, wherein slots 85 are being formed. In Fig. 4 the units are at the completion of the one half cycle, with the routing tools finishing the formation of the apertures 86. It is apparent that the depth of the slots 85 may be varied by varying the location of the base members 25 upon their slides 20. The cross-sectional contour of the grooves as well as the apertures in the article, may also be varied by varying the size of the routing tools 33 and the extent of movement thereof. Furthermore, articles of various sizes may receive these and similar operations in the apparatus due to the various adjusting means in the units.

Although specific improvements of the invention have been shown and described, it will be understood that they are but illustrative and that various modifications may be made therein without departing from the scope and spirit of this invention as defined by the appended claims.

What is claimed is:

1. A routing apparatus comprising a routing unit including a rotatable routing element, a movable support for work, means to cause movement of the support in a given direction, means to move the unit in a transverse direction, means movable with the support to limit the movement of the unit during a movement of the support to cause the element to cut a groove in the work, and means to stop the work support at a given position relative to the unit and render the moving means for the latter effective to further move the element to cut a hole in the work.

2. A routing apparatus comprising a routing unit including a rotatable routing element, a movable support for work, means to cause movement of the support in a given direction, means to move the unit in a transverse direction, and cooperating means carried by the unit and work support to limit the movement of the element to cause the element to cut a groove of a given depth in the work, stop the work support, and free the unit for additional movement to cause the element to cut a hole in the work.

3. A routing apparatus comprising a routing unit including a rotatable routing element, a movable support for work, means to cause movement of the support in a given direction, means to move the unit in a transverse direction, and cooperating means carried by the unit and work support to limit the movement of the element to cause the element to cut a groove of a given depth in the work, stop the work support, lock it against movement and free the unit for additional movement to cause the element to cut a hole in the work.

4. A routing apparatus comprising a routing unit including a rotatable routing element, a movable support for work, means to cause movement of the support in a given direction, means to move the unit in a transverse direction, and cooperating means carried by the unit and work support to limit the movement of the element to cause the element to cut a groove of a given depth in the work, stop the work support, lock it against movement, free the unit for additional movement to cause the element to cut a hole in the work, and limit the depth of the hole.

5. A routing apparatus comprising routing units mounted at spaced positions and including rotatable routing elements, a movable support for work interposed between the units, means to cause movement of the support in a given direction, means to move the units toward the work and cooperating means carried by the units and the work support to limit the movement of the elements to cause them to cut grooves of given depths in the work, stop the work support, lock it against movement, free the units for additional movements thereof to cause the elements to cut holes in the work, and limit the depths of the holes.

OTIS N. GOVE.
LLOYD L. MILLER.